United States Patent [19]
DeKoning et al.

[11] Patent Number: 5,933,824
[45] Date of Patent: Aug. 3, 1999

[54] METHODS AND APPARATUS FOR LOCKING FILES WITHIN A CLUSTERED STORAGE ENVIRONMENT

[75] Inventors: Rodney A. DeKoning; Gerald J. Fredin, both of Wichita, Kans.

[73] Assignee: LSI Logic Corporation, Milpitas, Calif.

[21] Appl. No.: 08/773,470

[22] Filed: Dec. 23, 1996

[51] Int. Cl.⁶ .................................................. G06F 17/30
[52] U.S. Cl. .................................... 707/8; 707/10; 707/1; 395/726; 711/100
[58] Field of Search ........................... 707/8, 1, 10, 201, 707/200; 711/100; 395/726

[56] References Cited

U.S. PATENT DOCUMENTS

| | | | |
|---|---|---|---|
| 3,702,006 | 10/1972 | Page ............................................. | 444/1 |
| 5,101,492 | 3/1992 | Schultz et al. ...................... | 395/182.08 |
| 5,148,432 | 9/1992 | Gordon et al. ...................... | 371/182.05 |
| 5,210,860 | 5/1993 | Pfeffer et al. ....................... | 395/183.18 |
| 5,249,279 | 9/1993 | Schmenk et al. .......................... | 395/825 |
| 5,317,731 | 5/1994 | Dias et al. ................................... | 707/8 |
| 5,331,476 | 7/1994 | Fry et al. .................................... | 360/53 |
| 5,367,669 | 11/1994 | Holland et al. ...................... | 395/182.05 |
| 5,386,324 | 1/1995 | Fry et al. .................................... | 360/53 |
| 5,388,108 | 2/1995 | DeMoss et al. ...................... | 395/182.04 |
| 5,434,970 | 7/1995 | Schiffleger ................................ | 395/200 |
| 5,440,743 | 8/1995 | Yokota et al. ........................... | 395/726 |
| 5,446,855 | 8/1995 | Dang et al. ................................. | 711/1 |
| 5,455,934 | 10/1995 | Holland et al. ............................. | 711/4 |
| 5,459,864 | 10/1995 | Brent et al. .............................. | 395/675 |
| 5,495,601 | 2/1996 | Narang et al. .............................. | 707/8 |
| 5,535,365 | 7/1996 | Bariruso et al. ......................... | 395/482 |
| 5,546,535 | 8/1996 | Stallmo et al. ...................... | 395/182.07 |
| 5,548,711 | 8/1996 | Brant et al. ......................... | 395/182.03 |
| 5,655,120 | 8/1997 | Witte et al. .............................. | 395/675 |
| 5,678,026 | 10/1997 | Vartti et al. .............................. | 395/479 |
| 5,682,537 | 10/1997 | Davies et al. ............................ | 395/726 |
| 5,694,571 | 12/1997 | Fuller ....................................... | 395/440 |
| 5,715,447 | 2/1998 | Hayashi et al. ............................. | 707/8 |
| 5,761,705 | 6/1998 | DeKoning et al. ..................... | 711/113 |
| 5,764,922 | 6/1998 | Peacock et al. ......................... | 395/275 |
| 5,787,304 | 7/1997 | Hodges et al. .......................... | 395/821 |
| 5,845,292 | 12/1998 | Bohannon et al. ...................... | 707/202 |

FOREIGN PATENT DOCUMENTS

| | | | |
|---|---|---|---|
| 0493984 | 7/1992 | European Pat. Off. ........ | G06F 11/10 |
| 0551718 | 7/1993 | European Pat. Off. ........ | G06F 11/20 |
| 0707269 | 4/1996 | European Pat. Off. ........ | G06F 12/08 |
| 0645702 | 3/1995 | Germany . | |
| 9513583 | 5/1995 | WIPO ............................. | G06F 12/00 |

OTHER PUBLICATIONS

A Case for Redundant Arrays of Inexpensive Disks (RAID); David Patterson, Garth Gibson & Randy Katz; Dec. 1987; pp. 1–24.

Primary Examiner—Paul V. Kulik
Assistant Examiner—Greta L. Robinson
Attorney, Agent, or Firm—Wayne P. Bailey; Daniel N. Fishman

[57] ABSTRACT

Methods and associated apparatus for coordinating file lock requests from a cluster of attached host computer systems within I/O controllers (e.g., intelligent I/O adapters) attached to a storage subsystem. The I/O controllers, operable in accordance with the methods of the present invention, includes semaphore tables used to provide temporary exclusive access to an identified portion of an identified file. The host systems request the temporary exclusive access of a file through the I/O controllers rather than over slower network communication media and protocols as is known in the art. The I/O controllers then manages a plurality of competing lock requests to provide mutual exclusivity of the file access. The file lock management is therefore managed over the higher bandwidth storage interface channels of the host systems and without the generalized network protocols burdening the lock management process and the host system CPUs. The I/O controllers in which the methods of the present invention are operable, as referred to herein, includes the controller within a storage device such as a RAID subsystem and decentralized control storage devices such as a RAID subsystem or a storage subsystem with control decentralized to a plurality of intelligent host adapters associated with the cluster of host systems.

37 Claims, 6 Drawing Sheets

FIG. 5
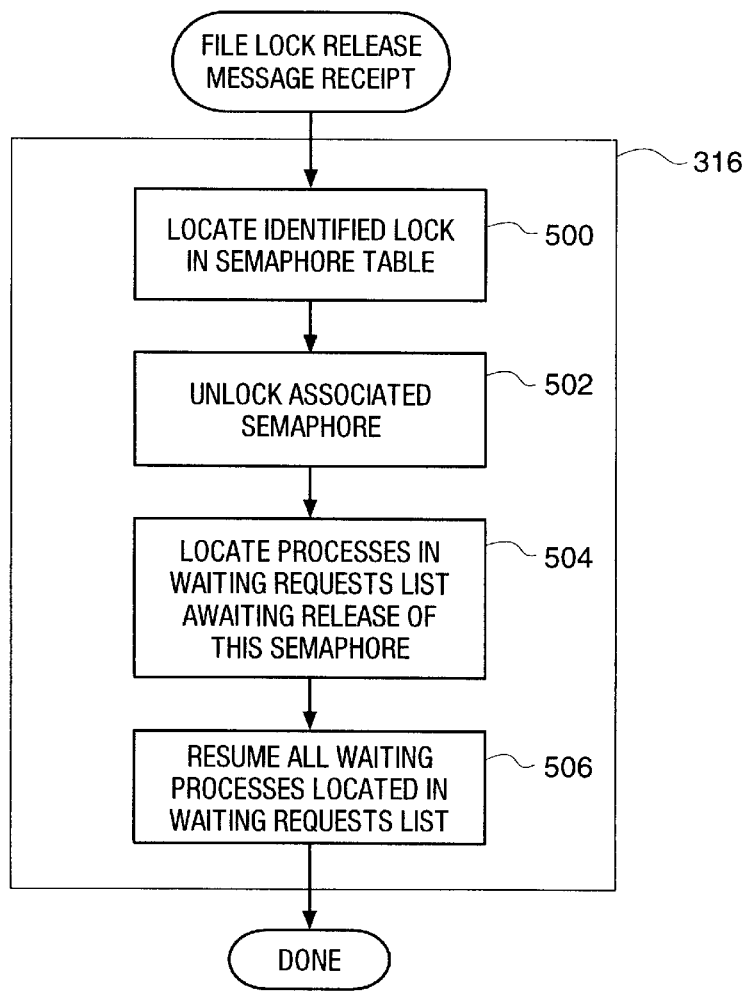
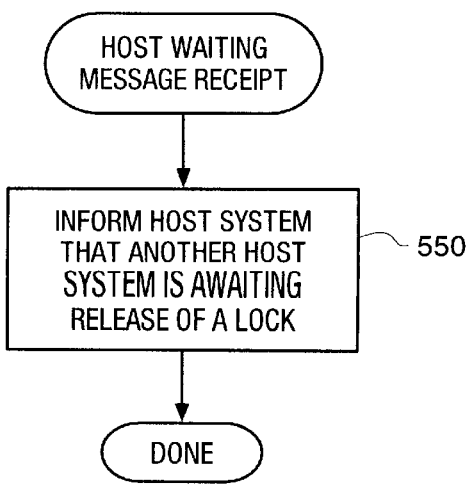

METHODS AND APPARATUS FOR LOCKING FILES WITHIN A CLUSTERED STORAGE ENVIRONMENT

RELATED PATENTS

The present invention is related to commonly assigned and co-pending U.S. patent application entitled "Methods And Apparatus For Coordinating Shared Multiple Raid Controller Access To Common Storage Devices", invented by Rodney A. DeKoning and Gerald Fredin, and having an internal docket number of 96-029 and a Ser. No. of 08/772,614, filed concurrently herewith on Dec. 23, 1996, and co-pending U.S. patent application entitled "Methods And Apparatus For Balancing Loads On A Storage Subsystem Among A Plurality Of Controllers", invented by Charles Binford, Rodney A. DeKoning, and Gerald Fredin, and having an internal docket number of 96-018 and a Ser. No. of 08/772,618, filed concurrently herewith on Dec. 23, 1996, both of which are hereby incorporated by reference.

BACKGROUND OF THE INVENTION

1. Field of the Invention

The present invention relates to storage subsystems and in particular to methods and associated apparatus which provide file locking functions within the I/O controllers (host adapters) of a clustered storage subsystem.

2. Discussion of Related Art

When multiple computing environments share access to common resources, such as mass storage files, it is known to lock the resource to attain temporary exclusive access to the resource. When all such computing environments are programs co-resident on a single computing platform, coordination of the locking and release of such shared resources is well known. Semaphore constructs provided as a service by many common operating systems allow application programs (and system programs) to easily coordinate such locking and releasing of a shared resource with a minimum of computational overhead imposed on the computing environment.

For example, when sharing access to a file, file system access API functions typically enable a user to request a lock over all or part of a specific file in the file system mass storage devices. The file system API function returns a status indicating that the requested lock has been granted or denied and the calling program proceeds accordingly.

However, when a computing environment is distributed, the coordination of locking of a shared resource requires interprocess communication, typically over a network communication medium using network communication protocols. Network protocols and communication media are often significantly slower than the bandwidth of communication with a mass storage device. Having to coordinate the locking and releasing of locks associated with files stored in mass storage subsystems can create a performance bottleneck restricting the perceived performance of a mass storage subsystem. In particular, the bandwidth limitations of networking protocols to implement file locking over network communication media causes severe performance degradation in use of high performance mass storage subsystems such as RAID storage subsystems.

In view of the above it is clear that a need exists for an improved method and apparatus for implementing file locking in a distributed computing environment including high performance mass storage subsystems.

SUMMARY OF THE INVENTION

The present invention solves the above and other problems, and thereby advances the useful arts, by providing methods and associated apparatus which implement high speed file locking features within high performance, clustered mass storage subsystems. In particular, the present invention utilizes the shared access controls described in co-pending patent application 96-029, which is incorporated herein by reference, to implement file locking controls within a plurality of cooperating storage I/O controllers (also referred to herein as I/O controllers, or simply controllers) within a cluster of host systems. A plurality of storage I/O controllers (such as intelligent I/O host adapters) exchange messages among one another to coordinate shared access to commonly attached storage devices within the storage subsystem. The exchanged messages include messages which grant temporary exclusive access to identified portions of an identified storage areas to which access is shared by multiple storage controllers.

The plurality of controllers operable in accordance with the present invention share common access to an area of storage in the storage devices. The storage devices (or simply a single storage device) may include any of several forms of storage devices including single disk drives, arrays of disk drives, arrays of disk drives managed as a single device (e.g., RAID subsystems), etc. Storage areas in such devices are referred to by a wide variety of terms. For example, partition is commonly used to refer to a portion of a single disk drive while logical unit (LUN) is a term common to RAID storage technology to represent a storage area in a RAID subsystem.

As used herein, "storage region" (or SR) refers to a storage area in any storage device or devices in which the methods of the present invention are employed. It is not to be construed as to limit the applicability of the present invention exclusively to RAID subsystems or to any other specific topology of storage devices. Rather the methods of the present invention are operable within a plurality of controllers which share access to a commonly attached storage region (SR). The SR may therefore be any of several configurations of storage devices which share connectivity to the plurality of controllers operable in accordance with the present invention.

In addition, as used herein, controller means any device which connects a host system to one or more storage devices. Such a controller also adapts the host system generated I/O requests (including file lock requests) to signals and protocols appropriate for exchange with the storage devices and for exchange among other controllers commonly attached to the same storage devices. For example, a controller as used herein includes a host adapter and in particular, intelligent I/O host adapters which possess a measure of processing capability for interpretation and processing of host system I/O requests.

One of the plurality of controllers sharing access to an SR is designated as the primary controller with respect to that SR. The primary controller is responsible for granting temporary exclusive access to a region (e.g., a portion of a file) of its associated SR to any of the controllers which request such access to the shared SR for purposes of processing host system generated I/O requests.

Further, the term "exclusive access" as used herein includes many types of exclusive access. For example, exclusive access by one controller may exclude any access (read or write) by any other controller. Or, for example, exclusive access by one controller performing a write operation may preclude only other write operations by other controllers while read operations may proceed. Such exclusive read/write access or exclusive write access, or other forms of temporary exclusive access are within the scope of the term "exclusive access" as used herein. In addition, use of the term "exclusive file access" is intended to be synonymous with the term exclusive access. The region over which exclusivity is requested or granted may be associated with a file, a portion of a file, or simply a portion of the logical blocks of the storage region (regardless of the file system structure superimposed thereon).

The present invention provides for extending the functions of the primary controller over that defined in co-pending patent application 96-029 to include methods and associated apparatus for maintaining information regarding file lock requests generated directly by attached host system requests. An attached host system which requires exclusive access to a shared file would direct the lock request to its intelligent I/O host adapter (controller) operable in accordance with the present invention rather than directing the exclusive access lock request to other networked computing platforms in the distributed environment. The host system's controller operable in accordance with the present invention would grant the requested temporary exclusive file access to the host system when such exclusivity is available and delay such a grant when the requested exclusivity is not available.

The exclusive file access request identifies a particular file to be locked by a unique handle known to all attached host systems (i.e., a universal identifier or UID) as well as the extent of the file for which exclusive access is required. The extent is identified by logical addresses within the file (e.g., offset from the start and length of the extent to be locked). Tables maintained within the primary controller associated with the identified SR are used to identify particular locked portions of identified files. When another I/O request from another attached host system requests a file lock (temporary exclusive file access) for an overlapping portion of a presently locked file, the methods of the present invention operable within the controllers delay the I/O request until the tables in the primary controller indicate that the locked extent is again freed for locking. The storage subsystem controllers operating in accordance with the present invention then inform the delayed host system that the requested lock is now granted. Host systems then use the locked file with assured exclusive access and inform the controllers that the lock may be released when the requisite exclusive access is completed.

The methods of the present invention are accessed by programs operable in the attached host systems through a standardized Application Program Interface (API). The API is designed to be substantially compatible with other standardized API's commonly used to manage the temporary exclusive access of portions of files. Whereas other standard API's direct the file lock related requests to other host systems via computer network media and protocols, the API embodiment of the methods of the present invention manages the file lock requests through controllers connecting the host systems to the storage subsystems.

The methods and associated apparatus of the present invention eliminate the overhead associated with prior file locking techniques in distributed computing environments. Specifically, the file locking access is coordinated through high speed access to high performance storage subsystems. All host systems in the cluster are commonly attached to the high performance storage subsystem via high speed buses and communication protocols. As compared to the lower speed network communication media and general purpose network communication protocols, the methods and associated apparatus of the present invention provide high speed file locking processing. In addition, the methods of the present invention provide file locking services with less overhead processing on the host system's processor.

It is therefore an object of the present invention to provide methods and associated apparatus for high speed file locking in a clustered computing environment.

It is a further object of the present invention to provide methods and associated apparatus for high speed file locking in a clustered computing environment via storage subsystem controllers commonly attached to all host systems in the clustered computing environment.

It is still a further object of the present invention to provide methods and associated apparatus for high speed file locking within a plurality of controllers associated with a storage subsystem where the plurality of controllers share concurrent access to commonly attached storage devices.

The above and other objects, aspects, features, and advantages of the present invention will become apparent from the following description and the attached drawing.

BRIEF DESCRIPTION OF THE DRAWINGS

FIG. 5 is two flowcharts a first describing the operation of methods of the present invention within the primary controller in response to receipt of a file lock release message for a file within the primary controller's management responsibility and a second describing the operation of the methods of the present invention within the controller which requested a lock in response to receipt of a message indicating another controller is awaiting release of that lock.

DETAILED DESCRIPTION OF THE PREFERRED EMBODIMENT

Figure 1:
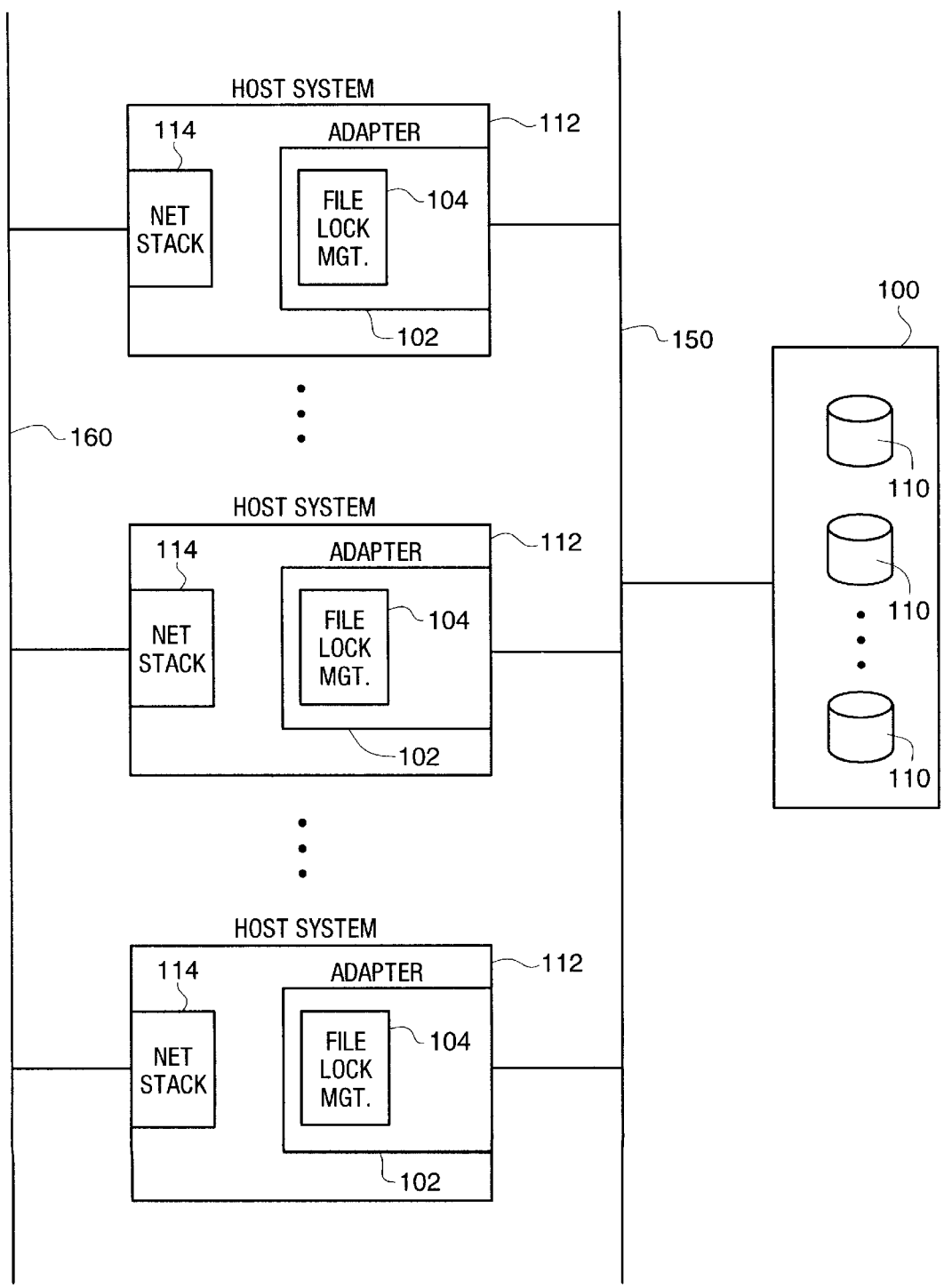
FIG. 1 is a block diagram of a clustered computing environment in which the methods of the present invention are advantageously applied and operable within intelligent I/O adapters within each host system of the cluster.

While the invention is susceptible to various modifications and alternative forms, a specific embodiment thereof has been shown by way of example in the drawings and will herein be described in detail. It should be understood, however, that it is not intended to limit the invention to the particular form disclosed, but on the contrary, the invention is to cover all modifications, equivalents, and alternatives falling within the spirit and scope of the invention as defined by the appended claims.

COMPUTING ENVIRONMENTS OF THE PRESENT INVENTION

FIG. 1 is a block diagram showing a computing environment in which methods known to the art may operate to manage file locks among a plurality of host computers and in which the methods of the present invention may operate to improve the management of such file lock requests. In FIG. 1 a cluster of host systems 112 are connected to one another via network 160 and commonly attached to storage subsystem 100 via bus 150. Network 160 may be any of several well known computer communication media including, for example, Ethernet, Token Ring, FDDI, and other standard computer network communication media. Any of several well known computer network communication protocols (denoted network stack 114 on FIG. 1) may be utilized in conjunction with network 160 including, for example, Netware®, TCP/IP, LAN Manager (NETBios/NETBEUI), etc. Bus 150 connecting host systems 112 to storage subsystem 100 can be any of several well known interconnection buses including, for example, SCSI, Fibre Channel, SSA, etc.

It is known in the art to use network 160 and the associated network protocols 114 to coordinate file sharing among the cluster of host systems 112. When a particular host system 112 desires temporary exclusive access to a particular file or portion of a file, it transmits messages to other host systems 112 via network 160. Typically a server process residing within one of the host systems 112 is centrally responsible for coordinating the multiple requests for temporary exclusive access. Problems arise in this known structure in that the network 160 and associated protocols 114 operable in the host systems 112 are not well tuned for high speed file locking. In addition, the generalized network protocols utilized in such network environments impose a significant processing load on the host systems 112. This known structure can therefore degrade overall storage subsystem performance for shared file access.

The methods of the present invention are operable within adapters 102 which connect each host system 112 to the storage subsystem 100 via bus 150 rather than within the host systems 112 per se via network connections 160. Bus 150 is typically capable of significantly higher communication bandwidth than is network 160. More importantly, the protocols operable on network 160 are generalized for a wide variety of communication applications whereas the host connections to the storage subsystem 100 are typically well tuned for high speed mass storage data transfers. For example, protocols such as TCP/IP on network 160 provide a myriad of services but impose significant overhead processing costs on the host system CPU.

In accordance with the present invention, all cooperating host systems 112 in the cluster may therefore communicate at higher speeds with modules well tuned to the needs of shared file access through the methods and apparatus of the present invention.

In particular, as shown in FIG. 1, storage subsystem 100 comprises physical storage on one or more disk drives 110. Storage subsystem 100 may be, for example, a RAID storage subsystem or a simpler, single storage device. Each host system 112 includes an adapter 102 (also referred to herein as a controller) which connects the corresponding host system 112 to the storage subsystem 100 via bus 150. As noted above, bus 150 provides communication between the several adapters 102 as well as between each adapter and the storage subsystem. The adapters 102 in each host system 112 may thereby exchange information amongst themselves to coordinate file lock services with minimal overhead processing load imposed upon the processors of the host systems 112.

Each adapter 102 includes a file lock management element 104 to provide the file lock services by exchanging information over the commonly attached bus 150. One adapter 102 from among the plurality of adapters commonly attached to storage subsystem 100 is designated as the primary controller with respect to files stored on that storage subsystem 100 (or with respect to files stored in a portion of the storage subsystem).

The primary controller is responsible for managing shared access to the SRs for which it is designated as primary. Added to that function under the methods of the present invention is the management of file lock requests from an attached cluster of host systems 112. Each controller 102, as shown in FIG. 1, therefore includes an element 104 representing the file lock management function operable within that controller 102 for managing file lock requests for the SRs for which the controller is designated as primary.

As described in detail in co-pending patent application 96-029, the plurality of controllers 102 in storage subsystem 100 cooperate to perform shared access management including the file lock methods of the present invention. Specifically, the controllers 102 exchange messages via any of several interconnection architectures including, use of a shared memory, use of the common disk drive communication channel (bus 150 of FIG. 1), and dedicated communication paths for the explicit purpose of interchanging messages between the plurality of controllers.

Figure 2:
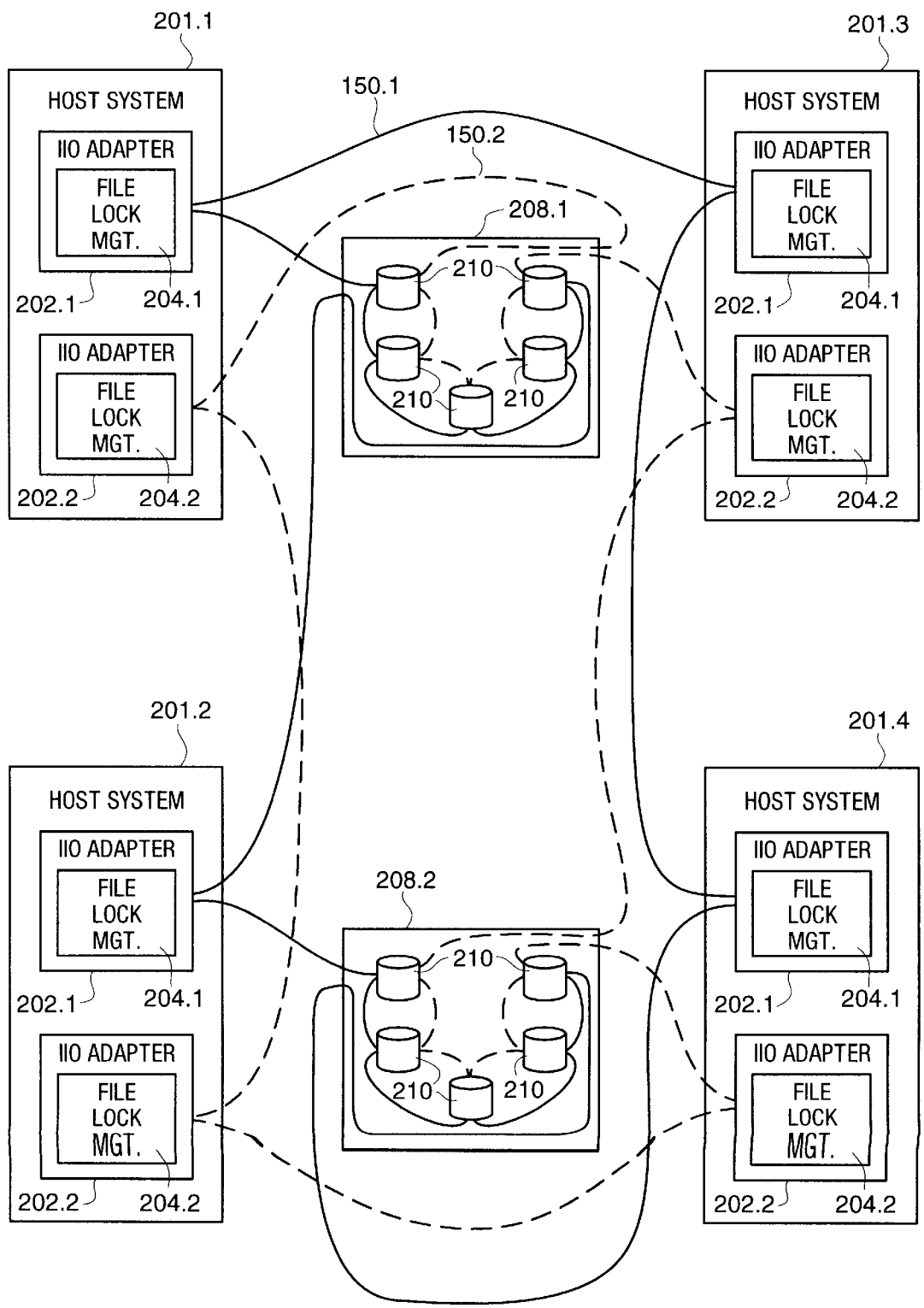
FIG. 2 is a block diagram of a clustered computing environment in which the methods of the present invention are advantageously applied and operable within redundant pairs of intelligent I/O adapters within each host system of the cluster.

FIG. 2 is a block diagram describing another computing environment in which the methods of the present invention may be advantageously applied. In FIG. 2, control of storage modules 208.1 and 208.2 is decentralized into one or more of intelligent I/O adapters 202.1 and 202.2 in each of the cluster of host systems 201.1–201.4. As shown in FIG. 2, each host system 201.1–201.4 has a pair of redundant intelligent I/O adapters 202.1 and 202.2, each attaching the associated host system 201.1–201.4 to redundant dual loop storage modules 208.1 and 208.2, respectively, via redundant Fibre Channel Arbitrated Loops (FC-AL) 150.1 and 150.2, respectively. Each redundant dual loop storage module 208.1 and 208.2 includes a plurality of storage devices 210 for reliable storage of information (typically in accordance with RAID management methods and structures).

As above with respect to FIG. 1, each adapter pair 202.1 and 202.2 may be designated as the primary controller with respect to particular files or sets of record stored in the storage modules 208.1 and 208.2. Other adapter pairs in other host systems which access the same SRs are designated as secondary with respect thereto. Each intelligent I/O adapter 202.1 and 202.2 in each host system 201.1–201.4 may therefore include a file lock management function element 204.1 and 204.2 to manage host system file lock requests directed to the SRs for which the adapter is designated as primary controller.

The intelligent adapters communicate with one another to exchange messages for managing file lock requests (as well as other management functions pertaining to primary/secondary functionality) via the FC-AL storage device interfaces. The host systems 201.1–201.4 need not therefore manage their shared file lock requests via slower, or as shown in FIG. 2, non-existent network connections. All shared access to the commonly attached storage modules 208.1 and 208.2 is managed through the intelligent I/O interface adapters via the FC-AL communication paths.

As depicted in FIG. 2, storage modules 208.1 and 208.2 represent any storage device including, for example, a stand-alone disk drive, a plurality of disk drives with embedded control functions, or a RAID storage subsystem with embedded RAID control capability. In addition, one of ordinary skill will recognize that intelligent I/O adapter 202.1 and 202.2 in each host system represent any of several levels of storage control including intelligent adapters as well as embedded RAID controllers.

Figure 6:
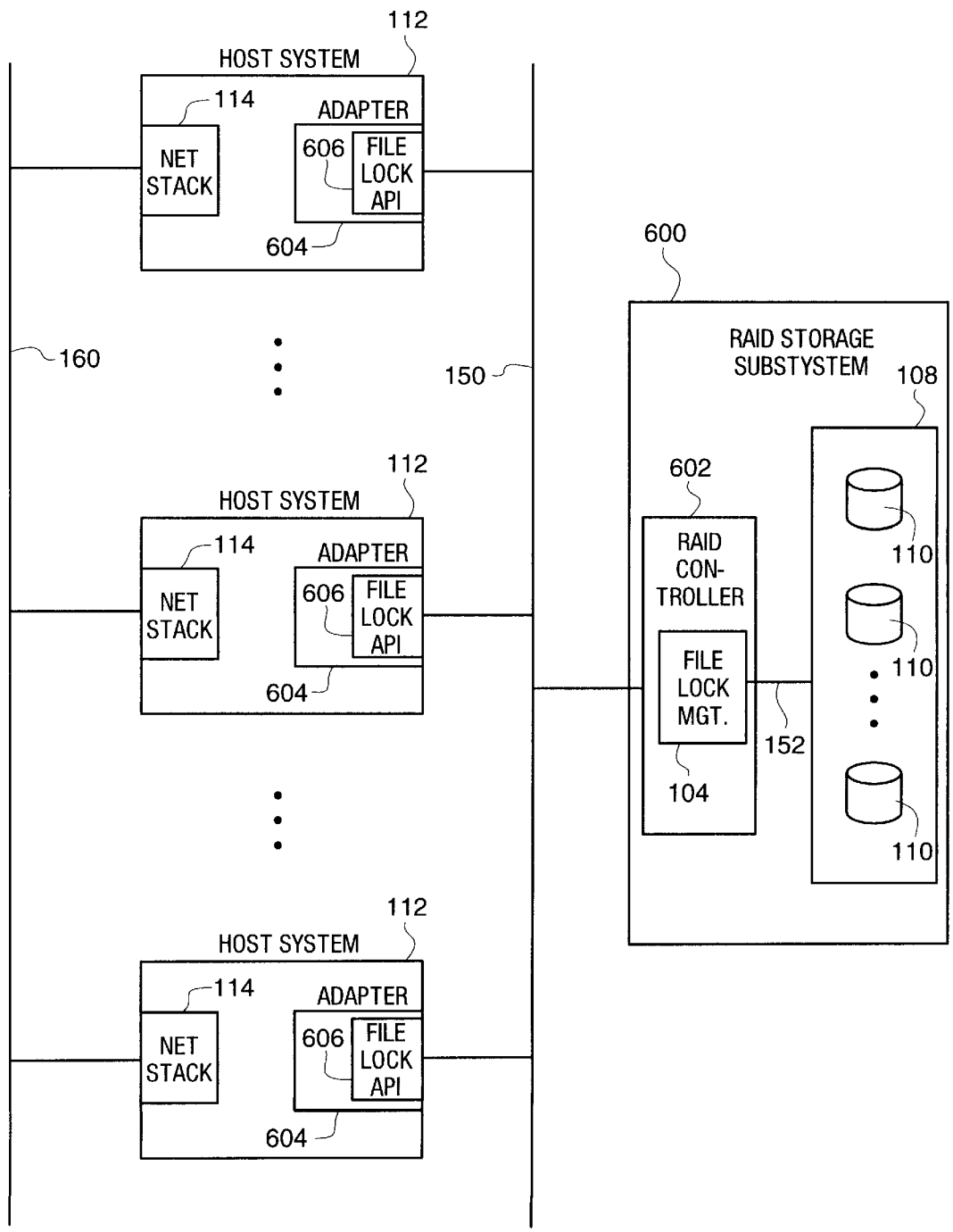
FIG. 6 is a block diagram of a clustered computing environment in which the methods of the present invention are advantageously applied and operable within a controller of the centralized RAID storage subsystem commonly attached to each host system of the cluster.

FIG. 6 is a block diagram depicting another clustered computing environment similar topologically to that of FIG. 1 in that a cluster of host systems 112 are commonly attached via bus 150 to a centralized storage subsystem 600. However, in FIG. 6, the storage subsystem 600 is a RAID storage subsystem wherein a RAID controller 602 manages several aspects of the redundant disk array 108. The processing for file lock management element 104 resides within the centralized RAID controller 602 of the RAID storage subsystem 600. Adapters 604 within each host system 112 therefore require only minimal processing capability to support the file lock management API functions 606. Adapters 604 may therefore be simpler bus adapters with little processing capability relating to file lock management. API function messages may be generated within host systems 112 and passed to the Adapters 604. The adapters 604 in turn pass the request messages on to the storage subsystem 600 for processing and return any status or data messages from the subsystem 600 to the requesting host system 112.

As used herein to describe the methods of the present invention, controller or I/O controller includes centralized storage control structures, such as one or more RAID controllers within a RAID storage subsystem as shown in FIG. 6, as well as decentralized control elements such as one or more intelligent I/O adapters within each of a cluster of host systems interconnected for purposes of message exchange via a commonly attached communication medium as shown in FIGS. 1 and 2.

FILE LOCK MANAGEMENT METHODS OF THE PRESENT INVENTION

Figure 3:
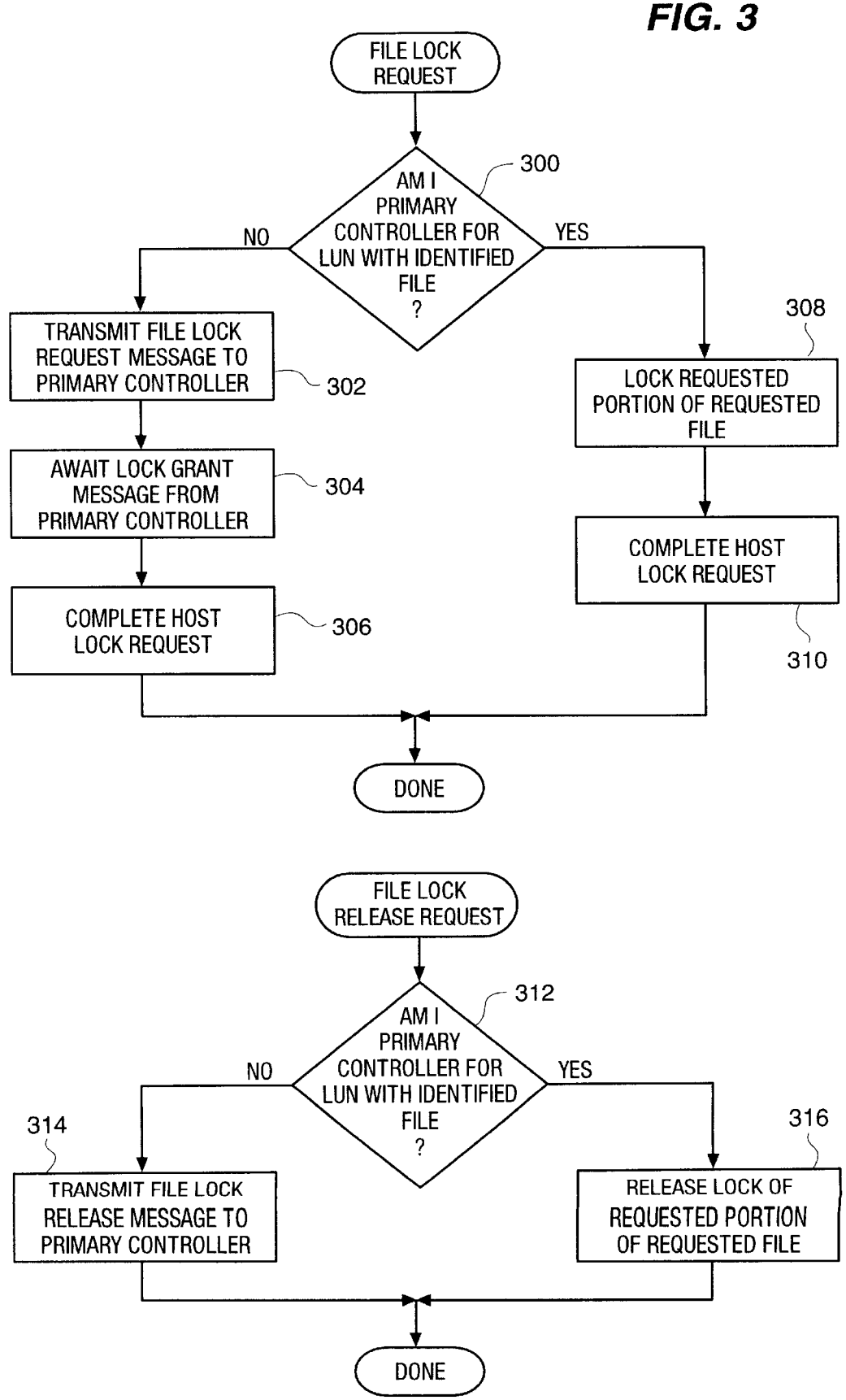
FIG. 3 is two flowcharts describing the methods of the present invention operable within each I/O controller performing the cooperative file lock management of the present invention.
Figure 4:
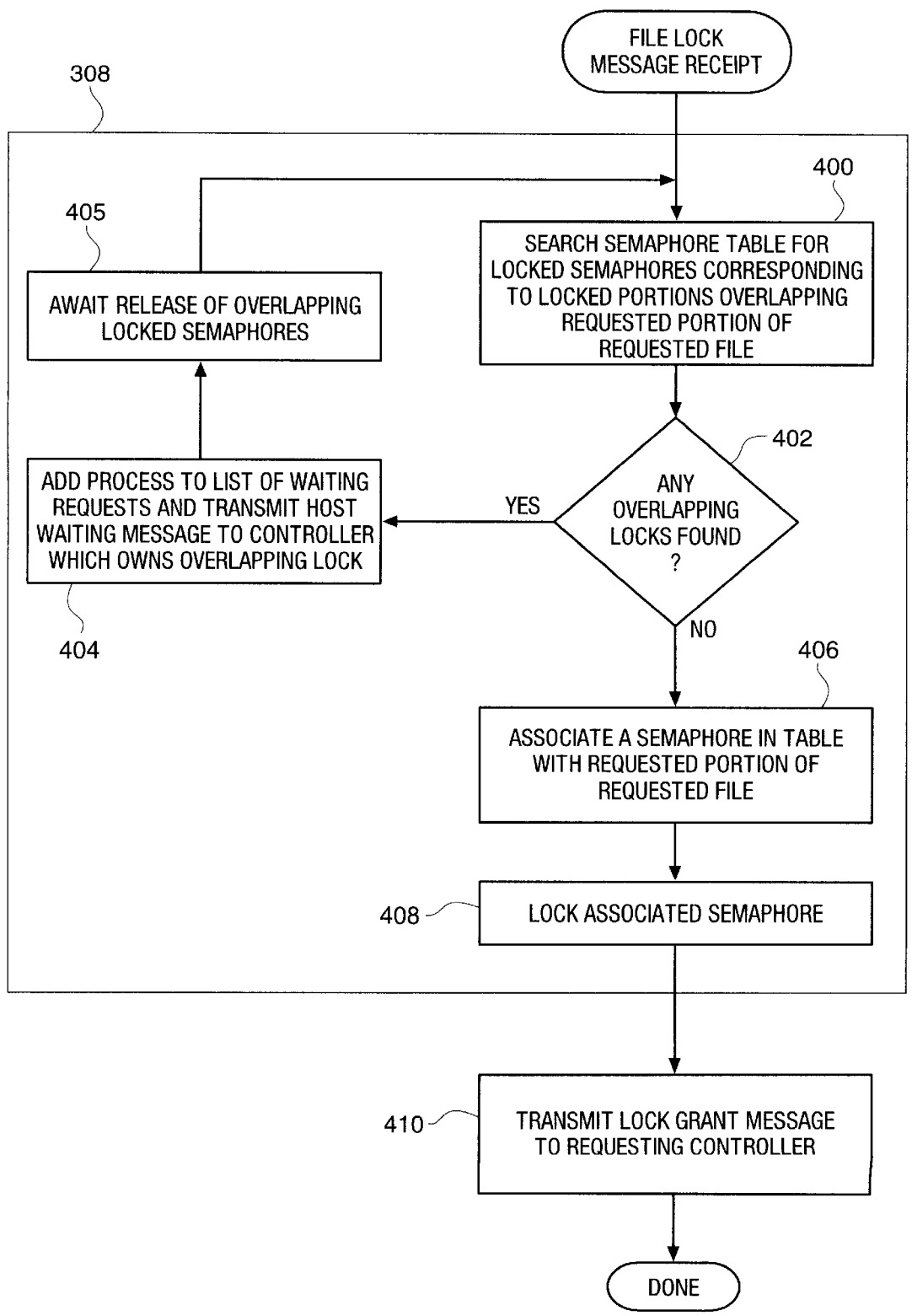
FIG. 4 is a flowchart describing the operation of the methods of the present invention within the primary controller responsive to receipt of a file lock request message for a file within the primary controller's management responsibility.

FIGS. 3–5 are flowcharts describing operation of the methods of the present invention in controllers (adapters as described above with respect to FIGS. 1 and 2). In response to receipt of a lock request from an attached host system, the methods of the present invention determine if other file lock requests, already granted, preclude the granting of the newly received file lock request. Each lock request includes at least a unique identifier for the file to be locked (unique with respect to the file and shared by all systems in the cluster of host systems) and a description of the extent of the file (a description of the portions of the file to be exclusively locked). The extent of the file to be locked is typically expressed in terms of offsets within a file and lengths. Optionally, the request may include a priority value used to prioritize this particular request with respect to requests of other processes within the same or other host systems.

The controller (the primary controller in cases where multiple controllers are active) then determines if other previously granted locks are for overlapping portions of the same file (as specified by the extent of other granted locks). Each lock that is granted is stored in a table entry retaining the file identifier and the associated extent of the granted locks along with an allocated semaphore used to lock the identified file. The methods of the present invention therefore are operable to search the table of granted locks to determine if a new lock request overlaps the locked portions (extent) of granted file locks. If a newly requested file lock overlaps a previously granted file lock, the new file lock request must await release of the granted lock (i.e., unlock of the associated locked semaphore). The request is deferred until the overlapping lock(s) are released. If no overlapping locks are located, the newly requested file lock may be granted immediately.

When a request is deferred awaiting the release of a previously granted overlapping file lock, the controller which owns the overlapping lock is notified (allowing notification of the host system which requested the granted lock) so that the host system may determine whether the granted lock should be released to permit waiting host systems to proceed. As noted above, a priority value associated with each file lock request may be used to prioritize the several file lock requests with respect to one another.

One of ordinary skill will readily recognize that the information regarding previously granted file locks may be stored in a table as described above or in any of several other well known data structures. For example, the information may be stored in linked list data structures or bit mapped data structures within the storage subsystem controller.

The host system's file lock request is eventually granted to permit the host system exclusive access to the identified portion of the identified file without interfering with, or interference from, other host system access. When the host system has completed it requested exclusive access, the granted lock is released by the host system. The host system generates a lock release request to be serviced by the storage subsystem. Upon receipt of the lock release request, the storage subsystem unlocks the associated semaphore. Unlocking the semaphore enables resumption of any suspended or deferred processing for other file lock requests previously received but deferred as described above.

Again, one of ordinary skill in the art will readily recognize that the resumption of deferred processing of earlier requested file locks may be by any of several well known software techniques. For example, standard multi-tasking programming paradigms relating to use of semaphores may be utilized to suspend a process (task) awaiting the release of one or more semaphores corresponding to granted, overlapping, previously granted file locks. As noted above, a file lock request may include a priority value useful to determine the order of resuming suspended lock requests. Without such a host defined priority value, any of several well known ordering techniques may be applied to fairly, or randomly, select the next suspended lock request to be granted following release of a previously locked semaphore.

In addition to such multi-tasking programming paradigms, any of several simple data structures such as arrays, lists, queues, etc., may be employed to record waiting (suspended or deferred) lock requests. Such a data structure may then be searched in response to release of a previously locked semaphore to locate one (or more) deferred lock requests which may now be granted (thereby resuming the processing of the host system lock request).

Specifically, FIG. 3 is a flowchart describing the methods of the present invention operable within a controller (adapter) in accordance with the present invention. Element 300 is operable in response to receipt within a controller of a file lock request initiated by a host system. The file lock request is processed by the primary controller associated with the SR that contains the identified file to be locked. Element 300 therefore determines whether this controller is the primary controller with respect to the particular SR that contains the file for which a lock has been requested. If element 300 determines that this controller is the primary controller for the SR which stores the requested file, processing continues with element 308. Otherwise, processing continues with element 302.

Elements 302–306 are operable to process a lock request received from an attached host system where the present controller is a secondary controller with respect to the SR containing the file identified in the lock request. Specifically, element 302 generates and transmits a file lock request message to the primary controller associated with the SR storing the file to be locked. The lock request message asks the primary controller to grant a lock on the identified portion of the identified file of the host system's lock request. The lock request message includes the identified portion (extent) and the identified file from the host system's lock request as well as an identifier (handle) by which the primary controller may inform this secondary controller that the requested lock has been granted.

Element 304 is next operable to await receipt of a lock request grant message from the primary controller. Processing of this lock request within this controller is suspended (deferred) until the primary controller grants the requested file lock. The primary controller indicates the granting of the requested lock by returning such a message to the requesting secondary controller (this controller with respect to the method of FIG. 3). Until the grant message is received, processing of this host system file lock request, within this controller, is deferred. Well known multi-tasking techniques within this controller may be employed to permit continued processing of other tasks within this controller. Eventually, when the file lock request grant message is received, processing within this controller relating to the host system requested lock will resume.

Element 306 is then operable to complete the host system interaction to grant the host's requested exclusive access file lock. For example, depending upon the host communication medium and protocols, a completion status may be returned to indicate completion of the host's file lock request. Element 306 is therefore representative of whatever processing is required to complete a particular command sequence in accordance with the standards of the host communication medium and protocols. Processing is then completed within this (secondary) controller for obtaining a requested lock on behalf of an attached host system.

Element 308 is operable in response to element 300 determining that the present controller is the primary controller with respect to the SR that stores the file identified in the received file lock request. Element 308 directly performs the processing required to lock the identified portion of the identified file. Since the present controller is the primary controller it may directly coordinate this lock request (received from a host system) with other lock requests received indirectly through messages from secondary controllers associated with the same SR. Details of the processing performed within element 308 by the primary controller are discussed herein below with reference to FIG. 4. Element 310, as above with respect to element 306, is then operable to complete the processing of the host system's lock request by transmitting completion information and status back to the requesting host system.

Also shown in FIG. 3 is a flowchart of the processing performed within a controller in response to receipt of a host system request to release a previously granted file lock. Element 312 of FIG. 3 is operable to determine whether this controller is the primary controller with respect to the particular SR that contains the file for which a lock release has been requested. If element 312 determines that this controller is the primary controller for the SR which stores the requested file, processing continues with element 316. Otherwise, processing continues with element 314.

Element 314 is operable when this controller is a secondary controller with respect to the SR containing the identified file for which the previously granted lock is to be released. As above with respect to a file lock request from a host system, element 314 operable in a secondary controller generates and transmits a message to the primary controller associated with the SR containing the identified file to release the previously granted lock request. Element 316 is operable in response to element 300 determining that the present controller is the primary controller with respect to the SR storing the identified file. Element 316 directly performs the processing required of the primary controller to release a previously granted lock request. Additional details of the operation of element 316 are presented below with respect to FIG. 5. Elements 314 and 316 complete the processing within a controller in response to a release file lock request received from an attached host computer.

One of ordinary skill in the art will readily recognize that the methods of the present invention are similarly applicable to storage subsystems having a single controller (adapter) commonly attached to a plurality of host systems rather than a plurality of adapters each within a host system. In such a configuration no communications are required between a plurality of controllers. Rather, the single controller coordinates the lock requests of a plurality of host systems. Such a single controller configuration is operable in accord with the present invention in that it may operate in the role of a primary controller for all host system lock requests and lock request releases. In other words, a single controller need only perform the operations of elements 308–310 and 316 in order to coordinate lock requests from a plurality of host systems.

As noted above, the primary controller in a multiple controller configuration must manage lock requests from a plurality of host systems received both directly from attached host systems and indirectly from messages received from secondary controllers attached to host systems. FIG. 4 describes the processing unique to the primary controller for processing of lock requests received indirectly via messages from secondary controllers attached to host systems. Elements 400–408 of FIG. 4 are common to, and provide details of, the operation of element 308 of FIG. 3. For example, elements 400–408 could be implemented as a function callable from both the method of FIG. 4 to process lock request messages received from secondary controllers as called from the method of FIG. 3 to process lock requests received directly from host systems attached to the primary controller. The method of FIG. 4 is therefore operable in response to direct receipt of a lock request by a primary controller or in response to an indirect lock request received by the primary controller as a message from a secondary controller.

Element 400 of FIG. 4 is operable to search for previously granted file locks to determine if other granted locks correspond to portions of the storage subsystem which overlap the newly requested file lock. As noted above, information regarding granted locks may be organized as a table or as other equivalent data structures to permit searching for locked regions of the storage subsystem which may overlap the identified file portions of a new lock request. As used herein, overlapping locks are those which would preclude simultaneous access. As noted above, locks may preclude only certain types of access (i.e., exclusive write access or exclusive read/write access). The determination of which locks overlap a new lock request therefore includes a determination that the types of access are incompatible.

Element 402 is then operable to determine if any such overlapping locked regions were located by operation of element 400. If no such overlapping regions are presently locked, then processing continues with element 406. Otherwise, if one or more locked regions are located which overlap the file portion of a newly requested file lock, then processing continue with element 404.

Elements 404 and 405 are operable to defer further processing of this lock request until overlapping locked regions are released. In particular, element 404 adds the present process (the task processing this new lock request) to a list of deferred processes awaiting release of particular locks which overlap the newly requested file lock. Element 404 is further operable to transmit a message to the controller(s) which owns the overlapping lock(s) indicating that a host system is awaiting release of the overlapping granted lock. The host waiting message informs the owner of the lock that another host is awaiting the release of the lock. The host which owns the overlapping, previously granted lock may then determine if the lock should be released to allow another host system to proceed.

Element 405 then suspends further processing by the present task until the required semaphores are released. Standard multi-tasking programming paradigms permit other processing to continue within the primary controller while the processing of a new lock request is deferred. Such standard programming techniques and structures are well known to those of ordinary skill in the art to suspend processing of a new lock request while permitting other processing within the primary controller to continue. When processing is eventually resumed with respect the new lock request, the method of the present invention continue by looping back to element 400 to re-check the table of presently locked regions on the storage subsystem.

Element 406 is operable in response to element 402 determining that new presently locked regions in the storage subsystem overlap the identified file portion of the new lock request. Element 406 is then operable to associate a semaphore with the new file lock request in an entry in the table of locked regions of the storage subsystem. Such an entry includes the file handle as well as the extent (portion) of the file to be locked for exclusive access. As noted above, the entry may optionally include a priority value to determine the order in which deferred processes are resumed. Element 408 then locks the semaphore associated with the new lock request to enforce the requested file lock.

Element 410 is operable when element 308 is invoked by reception at the primary controller of a message from a secondary controller to lock a file. Element 410 generates and transmits a lock request grant message to permit the requesting secondary controller to resume processing of the lock request it received from an attached host system. As noted above with respect to FIG. 3, the secondary controller initiates the processing of a lock request by transmitting a lock request message to the primary controller. The secondary controller then suspends further processing of the lock request until the primary controller transmits the lock request grant message. Element 410 is therefore the primary controller processing which transmits this message. This completes processing of the methods of the present invention within the primary controller of a multi-controller storage subsystem to grant a requested file lock.

FIG. 5 is a flowchart describing the processing of the methods of the present invention to release a previously granted file lock. The method of FIG. 5 is operable within the primary controller of a multiple controller storage subsystem in response to receipt of a message from a secondary controller requesting the release of a previously granted file lock. As noted above, the flowchart of FIG. 5 provides additional detail of the operation of element 316 of FIG. 3 operable within the primary controller as a function to release a locked file in response to a direct request from a host system to the primary controller or in response to the indirect request received as a message from a secondary controller.

Element 500 is therefore operable to locate the identified file in the table of presently locked files. Element 502 then unlocks the associated semaphore identified in the table entry for the identified file. Element 504 then locates all (if any) processes awaiting the release of this file (the unlock of the semaphore). Element 506 then resumes the processing of any suspended tasks which are found to be awaiting the unlocking of a semaphore.

As discussed above, other lock requests may be suspended (deferred) if overlapping portions of the file to be locked are already locked by other lock requests. Element 502, by unlocking a locked semaphore, may enable the continued processing of one or more suspended processes involved in the lock of other portions of files. As noted above, well known multi-tasking programming techniques may be employed to suspend and resume processes based upon the locked or unlocked status of semaphores. Elements 502–506, together, therefore represent the processing to resume a suspended (deferred) process based upon the unlocking of a locked semaphore.

Element 550 of FIG. 5 represents the processing within a controller in response to receipt of a host waiting message generated and transmitted as discussed above with respect to element 404 of FIG. 5. The controller which owns a lock which overlaps a newly requested file lock is informed that another host system is awaiting the release of the lock. Element 550 then informs the host system associated with the controller that another host is awaiting release of the lock. The host is informed as to the identity of the lock for which another host system is awaiting release and (optionally) informs the host system of the priority of the file lock request which is deferred awaiting release of the previously granted lock. The host system uses the supplied information to determine whether the previously granted lock should be released to permit other host systems to obtain their respective requested file locks.

As discussed elsewhere herein, messages exchanged between a primary and secondary controller in a storage subsystem may be transmitted via any of several communication media and protocols including, shared memory devices commonly attached to the controllers, the disk channel used to communicate to the storage devices as well as all attached controllers (e.g., SCSI or FC-AL), and a dedicated communication channel for such message exchange to coordinate shared access to commonly attached storage devices. The messages, as discussed above, include lock request messages from a secondary controller to a primary controller, lock request grant messages from a primary controller to a secondary controller, host waiting release request messages, and lock request release messages from a secondary controller to a primary controller.

While the invention has been illustrated and described in detail in the drawings and foregoing description, such illustration and description is to be considered as exemplary and not restrictive in character, it being understood that only the preferred embodiment and minor variants thereof have been shown and described and that all changes and modifications that come within the spirit of the invention are desired to be protected.

What is claimed is:

1. In a clustered computing environment including a plurality of host systems attached to a common storage subsystem, a method operable within I/O controllers associated with said storage subsystem for coordinating exclusive file access within said storage subsystem by said plurality of host systems, said method comprising the steps of:

locking an identified portion of an identified file in response to receipt of a lock request received by one of said I/O controllers from an attached host system wherein the locking step is operable within one of said plurality of I/O controllers; and releasing the lock of said identified portion of said identified file in response to a release request received by said one of said I/O controllers from said attached host system wherein the releasing step is operable within one of said plurality of I/O controllers.

2. The method of claim 1 further comprising the step of:

deferring processing of requests received from others of said plurality of attached host systems wherein said requests are associated with said identified portion of said identified file wherein the deferring step is operable within one of said plurality of I/O controllers.

3. The method of claim 2 wherein said storage subsystem includes a plurality of controllers for processing of requests received from said plurality of attached host systems and wherein the method further comprises the step of:

designating one of said plurality of controllers as the primary controller with respect to a particular subset of storage within said storage subsystem; and designating others of said plurality of controllers as secondary controllers with respect to said particular subset of storage.

4. The method of claim 3 wherein the step of locking comprises the steps of:

exchanging file lock request messages between said primary controller and a requesting one of said secondary controllers; and exchanging file lock grant messages between said primary controller and said requesting one of said secondary controllers.

5. The method of claim 4 wherein the step of releasing the lock comprises the step of:

exchanging file lock release messages between said primary controller and a requesting one of said secondary controllers.

6. The method of claim 2 wherein the step of locking further comprises the steps of:

associating a semaphore with said identified portion of said identified file of said lock request received from said attached host system;

determining that said semaphore is not presently locked in association with another lock request received from an attached host system; and locking said semaphore in response to the determination that said semaphore is not presently locked.

7. The method of claim 6 wherein the step of deferring processing further comprises the steps of:

adding said lock request to a list of deferred lock requests in response to a determination that said semaphore is presently locked;

determining subsequently that the lock of said semaphore has been released.

8. The method of 7 wherein the step of adding said lock request to a list includes the step of:

informing an attached host system which previously locked said semaphore that said lock request is awaiting release of the lock of said semaphore.

9. In a RAID storage subsystem attached to a plurality of host systems through a plurality of I/O controllers, a method for managing file lock requests received in said plurality of I/O controllers from said plurality of host systems, said method comprising the steps of:

receiving a first lock request in one of said plurality of I/O controllers from one of said plurality of attached host systems, said lock request specifying an identified portion of an identified file for which exclusive access is required;

determining, within one of said plurality of I/O controllers, if a previously received lock request precludes granting exclusive access to said identified portion of said identified file;

granting, within one of said plurality of I/O controllers, the exclusive access of said first lock request in response to the determination that no previously received lock request precludes granting exclusive access to said identified portion of said identified file; and deferring, within one of said plurality of I/O controllers, the grant of exclusive access of said first lock request in response to the determination that a previously received lock request precludes granting exclusive access to said identified portion of said identified file.

10. The method of claim 9 further comprising the step of:

releasing, within one of said plurality of I/O controllers in response to a release request received in said one of said plurality of I/O controllers from one of said plurality of attached host systems, the exclusive access previously granted in response to a previously received lock request.

11. The method of claim 10 further comprising the step of:

adding, within one of said plurality of I/O controllers, said first lock request to a list of waiting requests in response to the determination that a previously received lock request precludes granting exclusive access to said identified portion of said identified file.

12. The method of claim 11 wherein the releasing step includes the steps of:

locating on said list of waiting request, in response to the releasing step, a next lock request previously received from one of said plurality of attached host systems and deferred in accordance with the deferring step;

removing said next lock request from said list of waiting requests; and granting the exclusive access requested by said next lock request.

13. The method of claim 10 wherein the step of deferring the grant of exclusive access includes the step of:

pausing processing of said first lock request within said storage subsystem.

14. The method of claim 13 further comprising the steps of:

determining, within one of said plurality of I/O controllers, that no previously received lock request precludes granting exclusive access to said identified portion of said identified file; and resuming, within one of said plurality of I/O controllers, the processing of said first lock request in response to the determination that no previously received lock request precludes granting exclusive access to said identified portion of said identified file.

15. The method of 9 wherein the step of deferring the grant includes the step of:

informing an attached host system which generated said previously received lock request that said first lock request is awaiting release of said previously received lock request.

16. A method, operable within a plurality of I/O controllers attached to a RAID storage subsystem, for managing file lock requests received in said I/O controllers from a plurality of host systems attached to said RAID storage subsystem wherein one of said plurality of controllers is designated as the primary controller and at least one of said plurality of I/O controllers is designated as the secondary controller, said method comprising the steps of:

receiving, within said secondary controller, a first lock request from one of said plurality of attached host systems, said lock request specifying an identified portion of an identified file for which exclusive access is required;

transmitting a lock request message from said secondary controller to said primary controller to request the granting of said first lock request by said primary controller; and completing processing of said first lock request in response to receipt of a lock request grant message from said primary controller.

17. The method of claim 16 further comprising the step of transmitting a lock release message from said secondary controller to said primary controller to relinquish a previously granted file lock request.

18. The method of claim 17 further comprising the step of:

determining, within said primary controller, that a previously granted lock request excludes access to the identified portion of the identified file;

deferring granting of said first lock request in response the determination that a previously granted lock request excludes access to the identified portion of the identified file; and transmitting a lock request grant message from said primary controller to said secondary controller to grant said first lock request in response to the determination that no previously granted lock request excludes access to the identified portion of the identified file.

19. The method of claim 18 wherein the step within said primary controller of determining that a previously granted lock request excludes access to the identified portion of the identified file includes the step of:

associating a semaphore with said first lock request and determining that no locked semaphore is associated with another lock request which overlaps the identified portion of the identified file of said first lock request.

20. The method of 18 wherein the step of deferring granting includes the step of:

informing an attached host system which generated said previously granted lock request that said first lock request is awaiting release of said previously granted lock request.

21. The method of claim 17 wherein the releasing step includes the steps of:

determining, within said primary controller, that processing of other lock request messages has been previously deferred; and resuming processing, within said primary controller, for at least one of said other lock request messages previously deferred.

22. The method of claim 21 wherein the step of resuming processing includes the step of:

transmitting a lock request grant message from said primary controller to said secondary controller to grant said first lock request in response to the determination that no previously granted lock request excludes access to the identified portion of the identified file.

23. A method, operable within a system having a plurality of intelligent I/O adapters in a plurality of host systems, for managing file lock requests received from said plurality of host systems wherein one of said plurality of intelligent I/O adapters is designated as the primary controller and at least one of said plurality of intelligent I/O adapters is designated as the secondary controller, said method comprising the steps of:

receiving, within said secondary controller, a first lock request from one of said plurality of attached host systems, said lock request specifying an identified portion of an identified file for which exclusive access is required;

transmitting a lock request message from said secondary controller to said primary controller to request the granting of said first lock request by said primary controller; and completing processing of said first lock request in response to receipt of a lock request grant message from said primary controller.

24. The method of claim 23 further comprising the step of transmitting a lock release message from said secondary controller to said primary controller to relinquish a previously granted file lock request.

25. The method of claim 24 further comprising the step of:

determining, within said primary controller, that a previously granted lock request excludes access to the identified portion of the identified file;

deferring granting of said first lock request in response the determination that a previously granted lock request excludes access to the identified portion of the identified file; and transmitting a lock request grant message from said primary controller to said secondary controller to grant said first lock request in response to the determination that no previously granted lock request excludes access to the identified portion of the identified file.

26. The method of claim 25 wherein the step within said primary controller of determining that a previously granted lock request excludes access to the identified portion of the identified file includes the step of:

associating a semaphore with said first lock request and determining that no locked semaphore is associated with another lock request which overlaps the identified portion of the identified file of said first lock request.

27. The method of claim 24 wherein the releasing step includes the steps of:

determining, within said primary controller, that processing of other lock request messages has been previously deferred; and resuming processing, within said primary controller, for at least one of said other lock request messages previously deferred.

28. The method of claim 27 wherein the step of resuming processing includes the step of:

transmitting a lock request grant message from said primary controller to said secondary controller to grant said first lock request in response to the determination that no previously granted lock request excludes access to the identified portion of the identified file.

29. The method of 25 wherein the step of deferring granting includes the step of:

informing an attached host system which generated said previously granted lock request that said first lock request is awaiting release of said previously granted lock request.

30. A program storage device readable by a computer, tangibly embodying a program or instructions executable by computers in a plurality of I/O controllers connecting a plurality of host computer systems to a common storage subsystem to perform the method steps for coordinating exclusive file access within said storage subsystem by said plurality of host systems, said method steps comprising:

locking an identified portion of an identified file in response to receipt of a lock request received by one of said I/O controllers from an attached host system wherein the locking step is operable within one of said plurality of I/O controllers; and releasing the lock of said identified portion of said identified file in response to a release request received by said one of said I/O controllers from said attached host system wherein the releasing step is operable within one of said plurality of I/O controllers.

31. The program storage device of claim 30 wherein the method further comprises the step of:

deferring processing of requests received from others of said plurality of attached host systems wherein said requests are associated with said identified portion of said identified file wherein the deferring step is operable within one of said plurality of I/O controllers.

32. The program storage device of claim 31 wherein said storage subsystem includes a plurality of controllers for processing of requests received from said plurality of attached host systems and wherein the method further comprises the step of:

designating one of said plurality of controllers as the primary controller with respect to a particular subset of storage within said storage subsystem; and designating others of said plurality of controllers as secondary controllers with respect to said particular subset of storage.

33. The program storage device of claim 32 wherein the method step of locking comprises the steps of:

exchanging file lock request messages between said primary controller and a requesting one of said secondary controllers; and exchanging file lock grant messages between said primary controller and said requesting one of said secondary controllers.

34. The program storage device of claim 33 wherein the method step of releasing the lock comprises the step of:

exchanging file lock release messages between said primary controller and a requesting one of said secondary controllers.

35. The program storage device of claim 31 wherein the method step of locking further comprises the steps of:

associating a semaphore with said identified portion of said identified file of said lock request received from said attached host system;

determining that said semaphore is not presently locked in association with another lock request received from an attached host system; and locking said semaphore in response to the determination that said semaphore is not presently locked.

36. The program storage device of claim 35 wherein the method step of deferring processing further comprises the steps of:

adding said lock request to a list of deferred lock requests in response to a determination that said semaphore is presently locked;

determining subsequently that the lock of said semaphore has been released.

37. The program storage device of 36 wherein the method step of adding said lock request to a list includes the step of:

informing an attached host system which previously locked said semaphore that said lock request is awaiting release of the lock of said semaphore.

* * * * *